(12) United States Patent  (10) Patent No.: US 6,779,734 B2
Hill  (45) Date of Patent: Aug. 24, 2004

(54) MULTIPORT CARD

(75) Inventor: Michael John Hill, Coppet (CH)

(73) Assignee: Nagracard S.A. (CH)

( * ) Notice: Subject to any disclaimer, the term of this patent is extended or adjusted under 35 U.S.C. 154(b) by 0 days.

(21) Appl. No.: 10/380,660

(22) PCT Filed: Sep. 13, 2001

(86) PCT No.: PCT/IB01/01669

§ 371 (c)(1),
(2), (4) Date: Mar. 17, 2003

(87) PCT Pub. No.: WO02/23472

PCT Pub. Date: Mar. 21, 2002

(65) Prior Publication Data

US 2004/0089725 A1 May 13, 2004

(30) Foreign Application Priority Data

Sep. 15, 2000 (CH) .............................................. 1800/00

(51) Int. Cl.[7] .............................................. G06K 19/06
(52) U.S. Cl. ..................................... 235/492; 235/441
(58) Field of Search ................................. 235/492, 486, 235/487, 441; 902/1, 2

(56) References Cited

U.S. PATENT DOCUMENTS

| | | | | |
|---|---|---|---|---|
| 5,029,207 A | * | 7/1991 | Gammie | 380/228 |
| 5,541,583 A | * | 7/1996 | Mandelbaum | 340/10.51 |
| 6,035,037 A | * | 3/2000 | Chaney | 380/227 |
| 6,199,764 B1 | * | 3/2001 | Tsai | 235/492 |
| 6,279,824 B1 | * | 8/2001 | Park | 235/379 |

* cited by examiner

*Primary Examiner*—Daniel St. Cyr
(74) *Attorney, Agent, or Firm*—Piper Rudnick LLP; Steven B. Kelbert

(57) ABSTRACT

This invention concerns a conventional smart card comprising a rosette of eight contacts of the ISO 7816 type and at least one standard bi-directional channel, through which the exchange of data at a speed of about 500 Kbits/sec is possible. To allow the use of such a card in an environment that needs a processing of information of several Mb we propose to add on this card a high-speed series channel linked to non used connections by the standard bi-directional channel and to format a second bus (HSD) on which are linked several coding/decoding modules and multiplexing module (MUX). These modules are also linked to the conventional bus of the card.

17 Claims, 1 Drawing Sheet

MULTIPORT CARD

FIELD OF THE INVENTION

This invention concerns the field of smart cards.

BACKGROUND OF THE INVENTION

These cards are presented in the form of a compact module comprising a great number of electronic elements such as memories, microprocessors, modem. As technology progresses rapidly, performances reserved yesterday for big systems are from now on available in smart cards.

The standard ISO 7816 defines the interfacing of such a card that is carried out by the mean of a rosette of 8 contacts whose functions are defined by the standard.

The idea of such a card has been dictated by the need to have portable data supports that offer great security as to the protection of these data. Apart from their structures, they are used for storage and processing applications that need few inputs-outputs. In fact, according to standard ISO 7816, only one connection is used for this function in a bi-directional mode in half-duplex mode.

In this way, the evolution of these cards is limited by this structure limiting their use to control applications while the fast data processing is carried out in other units.

This is particularly the case in pay television, where the signals are coded by a key that varies with the time. In the flow of audio-video data arriving at the decoder are added management messages (EMM) that contain the keys in encrypted forms. When such a message is recognised it is directed to the smart card serving as security module.

In this embodiment, the smart card contains the different keys that allow to decrypt these messages and to verify if the subscriber has enough rights to view these data. If it is so, the card sends again information allowing the decoder to decode the coded data.

This method has several drawbacks. The first one is that it must supply the keys in clear to a decoder that is not considered as a secure element. This is also the reason why the keys are changed at regular intervals, typically every second. Although this structure is satisfactory in many respects it has a real problem in other applications, for example in the case of data storage. In this type of application, the notion of duration of the validity of a key disappears and is associated to the coded data, a key that only the smart card can decode.

It is well understood that the fact of supplying the key to the decoder, a computer in this example, implies a risk that said key be intercepted by a third person and disclosed without control.

In order to solve this problem, a possible solution is to decode the data directly in the smart card. In this way the coding key does not exit the card, because this key is used directly inside the card to process the coded data.

This type of use rapidly comes up against the physical constraints of the card ISO 7816 whose port I/O has a transfer rate of about 10 to 100 Kbits/sec.

The same type of problem arises when using a non-contact card of the type ISO 14443. The transfer rates being about 106 to 425 Kbits/sec.

Any structural modification of the card is confronted with a problem of compatibility with the readers ISO 7816 and ISO 14443 that will not understand this new specification.

SUMMARY OF THE INVENTION

The aim of the invention is to have a smart card that respects the compatibility with the existing readers and that proposes other services, particularly the possibility of decoding the coded data inside the card at the speed required by the data rate.

This aim is achieved by a smart card comprising a rosette of eight contacts ISO 7816 and at least one standard bi-directional channel, characterised in that it comprises a high speed channel linked to non used connections.

By non used connections we mean connections that do not have particular functions by the standard or connections that are no longer used in the present generations of cards.

In this category we find well understood the two connections RFU (Reserved for Future Use) as well as the connection Vpp that allowed to supply the non volatile memories with a voltage higher than 5V (normally from 12V to 21V). With the coming of new technologies of non volatile memories such as NVRAM, EEPROM or FLASH, this voltage is generated by the card itself, and this connection is no longer used nowadays.

Thanks to the use of these supplementary lines it is possible to define a protocol that is different to those used in the standard ISO 7816 and thus opens the field to other applications.

The available of three connections allow a high speed link thanks to a clock line (CLK), an input line (IN), and an output line (OUT). It is possible to use together the different access channels of the card, for example by the standard channel functioning bidirectionally by an I/O line. This high speed channel adds functions to those already existing, for example a high speed coding-decoding module.

The use of this high speed channel has consequences on the architecture of the card. From now on it is possible to propose a decoding (or coding) module that is totally carried out in inside the card. For this purpose the data arriving through the fast channel are directed towards a specialized decoding module. In fact, these data do not have to necessarily travel through the microprocessor, they can go directly to the specialized decoding module by an internal fast bus.

To this end, the smart card according to the invention comprises multiplexing means that allow a direct access between the fast channel and one or several specialized modules. These means also allow to direct the fast channel stream towards the microprocessor if necessary. If certain microprocessors cannot process data at speeds of several Mb/s, other more developed versions make this processing possible and can substitute certain specialized modules. Thus, the microprocessor, by software (programmable), will be able to be substituted in the specialized modules carrying out mathematical operations thanks to electronic circuits (non programmable).

According to the invention, the multiplexing means allow to serialize several specialized modules. The card according to the invention can comprise a first data compression module whose output is directed towards a coding module.

During the processing of data by the bias of the fast channel the other communication means remain available, particularly the I/O link described in the standard ISO 7816 or the non contact link of the type ISO 14443. It is thus possible to transfer the control information by these means, said information being used for the transmission of management information of the card, such as for example the parameters of the decoding modules or the rights attached to these parameters.

According to the invention, the multiplexing means comprise extraction and injection means in order to separate certain types of data from the data stream. A digital data stream for pay television comprises useful data such as audio or video and control data. When this flow is directed to the fast channel it is necessary to extract the control data that contain the information on the decoding keys as well as various management information.

This extraction and injection module is customized by the microprocessor and when a message corresponds to the recognition criteria, this message is directed towards the microprocessor.

The data processed by such a card are generally organised in blocks. Each block begins by a block identifier and describes the type of information contained in said block.

In the reverse function, that is the coding of data, this module can insert control data in the stream arriving from the fast bus. These control data are generated by the central unit for example to qualify the data flow, transmit the control words in coded form, or transmit routing information. To this respect, this module comprises a buffer memory that receives the blocks of data coming from the fast bus and the blocks of data coming from the central unit. If the buffer memory contains a block of control data, it is inserted in the stream at the end of a block of data coming from the fast bus. This flow is then transmitted towards the shaping module to be directed towards the fast output port.

Thanks to this structure it is possible to process all the stream inside the smart card, in this way greatly increasing the security of the data. It is also possible to create a complete stream of coded or decoded data inside the card including the management information such as the control words.

According to an embodiment, the fast channel follows the USB standards (Universal Serial Bus). The particularity of this interface is that the signals use two connections, one for the incoming data (IN) and the other for the outgoing data (OUT).

The smart card according to the invention comprises a module of protocol detection that enables it to adapt itself to the USB protocol and that converts it in the internal protocol of the smart card, for example by regenerating the clock.

BRIEF DESCRIPTION OF THE DRAWING

The present invention will be better understood with the help of the annexed figure, taken as a non-limiting example, in which the single drawing represents the architecture of a smart card and its reader according to the invention.

DETAILED DESCRIPTION OF THE INVENTION

Figure 1:
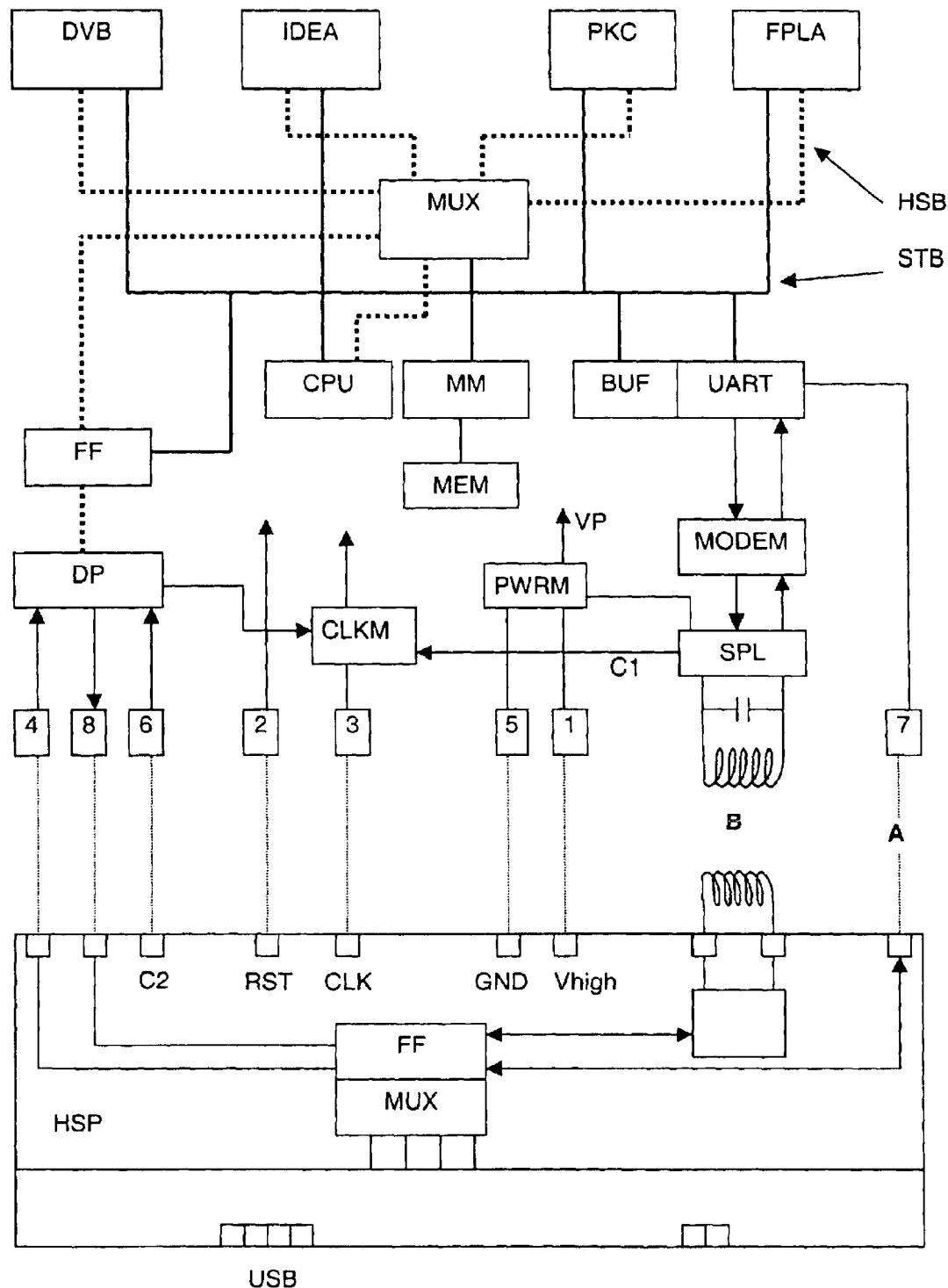

In this figure are represented the two types of link known in the art, that is, the galvanic link (A) and the non contact link (B). Although the known cards normally only comprise one of these links, it is possible for compatibility reasons to produce such a card.

The I/O link is directed towards a UART (Universal Asynchronous Receiver Transmitter) which is coupled with a buffer memory (BUF). The signals arriving in the UART are formatted and filtered in order to eliminate the noises and other interferences. The buffer memory (BUF) is used to memorise the incoming data before they are processed by the microprocessor.

A similar processing is carried out by the non contact channel (B). The signals emitted by the reader are used at the same time to feed the card. This is why the aerial of the card (20) has a quadruple function, i.e. to transmit and receive the data between the card and the reader, to provide a clock for the microprocessor and to supply the card. The supply module (SPL) transforms the high-frequency carrier into a voltage that is usable by the card. Above this module is a shaping module of the modulated signal such as a modem.

The voltage thus obtained is transmitted to a supply management module PWRM in charge of the selection of the supply source, particularly when several sources are available. In the embodiment where the card is supplied galvanically by the reader, the supply management module (PWR) selects principally the galvanic current coming from the reader. This regulated voltage VP is then distributed to the elements of the card.

The information decoded by the UART is then accessible on the standard bus (STB) represented with a thick line on the figure. This bus allows to link all the modules between themselves with the central unit (CPU) as management controller. For its memory needs, the card has a memory assembly (MEM) composed of a program memory (ROM or NVRAM), a working memory (RAM), and a save memory (NVRAM). These different memories can be managed by a memory manager (MM). This module also comprises the management of the access rights to the different memories.

The card according to one embodiment of the invention comprises a second fast bus (HSB) represented by a dotted line in the figure. This HSB bus can be of the parallel type or series and allows speeds of more Mb/s. The modules connected on this bus are also connected on the standard bus for the transmission of the initializations, the keys, and other customisations information. On the fast HSB bus are connected specialized coding-decoding modules according to the different supported protocols. In this way modules of the IDEA, DES, triple-DES, Hash or AES type are foreseen. Furthermore, other specialized modules such as compression or decompression modules can be added as needed.

A module using the FPLA technology (Field Programmable Logic Array) allows to program the operations of future coding algorithms. The central unit CPU can configure this module to carry out the operations necessary for the coding of information or any other function. This type of module normally arranges the single function blocks (shifting register, XOR for example) which are connected as needed to carry out the chosen complex function.

An important aspect of the invention is represented by the elements that compose the fast channel. A first protocol detection module DP is in charge of the formatting of the signals and of recognising the used protocol. The signals are converted according to the internal protocol, for example on a synchronised bus series with three wires. This module is in charge of the adaptation to the standard defined for the external interfacing. The detection of the protocol is done automatically, for example depending on the presence or absence of a clock signal or the frequency of transmission that is used.

Once the signals are formatted according to a known protocol, the signals are directed towards the multiplexer MUX. This module allows to send the signals to the target module according to the needs. The central unit CPU can for example configure the multiplexer to send the signals of the fast channel towards the IDEA coding module. When flowing, the extraction and injection module FF analyzes the data and extracts those that respond to the programmed criteria. When the recognition criteria are satisfied, an interruption is generated by the extraction and injection module FF, which informs the central unit CPU of the availability of these data.

The multiplexer MUX module can as well send the data towards the central unit CPU if the capacities of data flow processing are sufficient. It is equally possible to integrate in the MUX module a buffer memory to store the data temporarily before the target module can process them.

As is described above, the extraction and injection module FF functions in both directions and allows to insert the control blocks towards the fast channel.

It is known that this type of card does not have an internal clock generator, but that it is dependent on the clock signals coming from the reader. In our case, we have three possible clock sources, either the classic input CLK according to the standard ISO 7816, the C1 clock extracted from the non contact transmission, or the clock accompanying the fast bus C2. The clock management module CLKM manages these different sources and makes sure that the card receives the clock pulses. This module also comprises means for multiplying or dividing the frequency according to the needs. This module can produce several clock pulse signals according to the needs, for example a first frequency for the central unit CPU and a second frequency for the fast modules (DVD, PKC, IDEA . . . ).

The management of the different clock sources responds to criteria defined in terms of hierarchy. The order or priority is normally the source ISO 7816 (CLK), then the non contact source ISO 14463 (C1), and finally the fast channel source (C2).

This invention also concerns a card reader comprising means for communicating by a fast channel with the smart card.

This reader must be able to adapt to a great number of types of cards, particularly of different generations. The interface of the reader towards the computer is advantageously the USB port allowing fast transfers of data. The smart card might not support the protocol and require a three wired connection (IN, OUT, CLOCK). In this case, the reader comprises an interface that allows to convert the signals responding to the standard USB in an acceptable protocol for the card. It must be noted that the identification of the type of card, and also of its communication capacities, is carried out by the traditional channels well defined in the standard. These channels can either be of the type ISO 7816 (galvanic) or of the type ISO 14443 (electromagnetic channel).

According to a particular embodiment of the reader, the extraction and injection module FF is located inside the reader. In this way, all the flow can arrive by the fast channel, for example, by the USB interface, and it is in this reader that the recognition of the management messages will be made. The latter will be sent by the traditional channel to the smart card.

What is claimed is:

1. A smart card comprising:
   a plurality of contacts corresponding to a recognized standard;
   at least one standard bi-directional channel;
   a first bus linked to the at least one bi-directional channel;
   a processor linked to the first bus;
   a second channel linked to at least one contact of the plurality of contacts, the at least one contact being a contact that is not used by the bi-directional channel, the second channel being of higher speed than the bi-directional channel;
   a second bus linked to the second channel;
   a multiplexing module linked to the second bus; and
   a plurality of coding/decoding modules linked to the second bus via the multiplexing module.

2. The smart card of claim 1, wherein the multiplexing module and the coding/decoding modules are also linked to the first bus.

3. The smart card of claim 1, wherein the plurality of contacts are of an International Standards Organization (ISO) 7816 type.

4. The smart card of claim 1, wherein the plurality of contacts comprise eight contacts arranged in a rosette configuration.

5. The smart card of claim 1, wherein the bi-directional channel is linked to at least one contact of an ISO 7816 type.

6. The smart card of claim 5, wherein the bi-directional channel is linked to at least one contact of an IS0 14443 type.

7. The smart card of claim 1, wherein at least one of the coding/decoding modules is of an International Data Encryption Algorithm type.

8. The smart card of claim 1, wherein at least one of the coding/decoding modules is of a Data Encryption Standard (DES) type.

9. The smart card of claim 1, wherein at least one of the coding/decoding modules is of a triple-DES type.

10. The smart card of claim 1, wherein at least one of the coding/decoding modules is of an AES (Advanced Encryption Standard) type.

11. The smart card of claim 1, wherein at least one of the coding/decoding modules is of a hash type.

12. The smart card of claim 1, wherein the multiplexing module is connected in a star configuration.

13. The smart card of claim 12, wherein the star configuration allows at least two of he coding/decoding modules to be linked serially.

14. The smart card of claim 1, further comprising an extraction and injection module connected to the second bus, the extraction and injection module being configured to extract data of a predefined type from a data stream on the second bus and transmit extracted data to the processor.

15. The smart card of claim 14, wherein the extraction and injection module includes a control data input and a buffer memory that allows for the insertion of data into a data stream on the second bus.

16. A smart card comprising:
   a plurality of contacts corresponding to a recognized standard;
   at least one standard bi-directional channel;
   a first bus linked to the at least one bi-directional channel;
   a processor linked to the first bus;
   a second channel linked to at least one contact of the plurality of contacts, the at least one contact being a contact that is not used by the bi-directional channel, the second channel being of higher speed than the bi-directional channel;
   a second bus linked to the second channel;
   at least one coding/decoding module connected to at least one of the first bus and the second bus; and
   an extraction and injection module connected to the second bus, the extraction and injection module being configured to extract data of a predefined type from a data stream on the second bus and transmit extracted data to the processor.

17. The smart card of claim 16, wherein the extraction and injection module includes a control data input and a buffer memory that allows for the insertion of data into a data stream on the second bus.

* * * * *